8743X
I. Town.
Truss Bridge.
No. A.I. Patented Apr. 3, 1836.
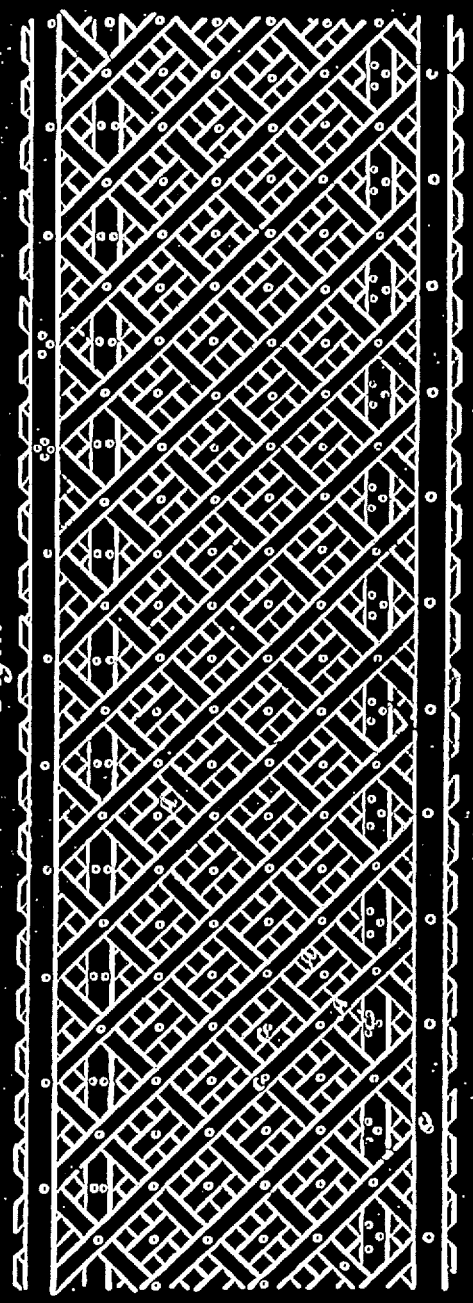
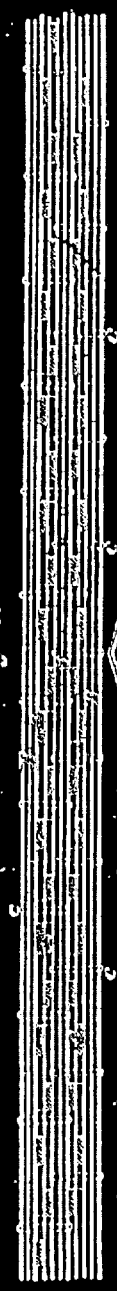
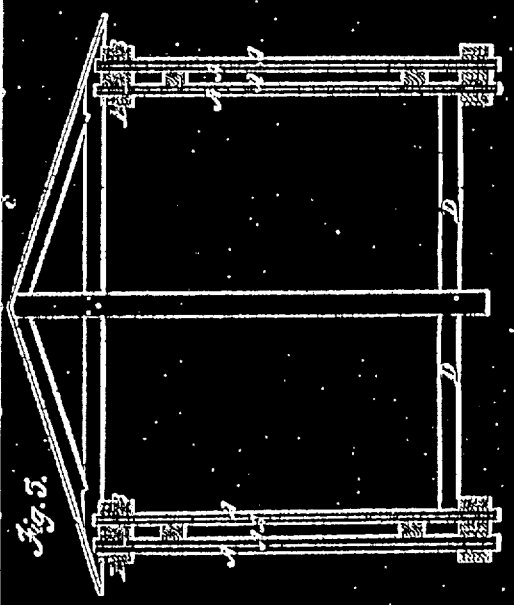

(April 3 1835)

Ithiel Town 8743X

Letters Patton.

The Schedule referred to in these Letters Patent and
making part of the same, containing a description in
the [illegible] of the said Ithiel Town, himself of his im-
provement [illegible] bridge patented the 28th day of
[illegible] 1820.

Be it known that I, Ithiel Town, of the City of New York,
County of New York, and State of New York, have made an
improvement on my bridge Patented on the 28th day of
January 1820. which is described as follows; reference
being had to the former description, deposited in the Patent
Office. The improvement on my former bridge which I now
wish to secured by Letters Patent, is as follows.
The side truss as described in my former patent being com-
menced or formed with diagonal braces at any suitable
distance apart and one or more horizontal string-pieces
at top and bottom, on each side of the braces. and all
properly dimentioned; proportioned to a suitable height of
truss, and secured. What I claim as the improvement is
the addition of another similar set or series of bracing of
similar kind and dimensions, to be placed in a similar
manner, either directly opposite to the former; or in any
other manner so as to bring the second tier not opposite
to the former; but so that all the intersections of the
braces of the latter series shall fall between those of
the former braces on the horizontal string-pieces, [illegible]
which [illegible] string piece is to be formed similar to the
strings at top and bottom; with one or more other lines
of [illegible] string-pieces, as required, for the
[illegible]

8743X

... Unless permission is granted ... or placed in the collections of any institution or individual.

various spans, to be placed over the intersections of the
last series of braces, against or opposite to the other string-
pieces; all of which last intersections of the second
series of braces, with the string pieces on each side there-
of to be secured with one or more treenails, or other suitable
fastenings; making in one truss, two sets, of two series
each, of braces, and three series of string pieces passing
over one or more of the intersections at top and bottom
of the truss to any number and extent required. In
case of very wide spans or openings a third, or a third
and fourth, &c sets or series of braces may in like manner
be added with their necessary string pieces, treenails
or other fastenings, &c — to any number or extent required.
One, two or more of these trusses with a floor and
other necessary parts as usual will constitute a bridge
thus improved.

Ithiel Town

Witnesses
Will. [illegible]
Wm. I. Elliot ([illegible])

(Granted April 3rd 1835)

(Drawing)